United States Patent
Yuasa et al.

(10) Patent No.: US 6,815,871 B2
(45) Date of Patent: Nov. 9, 2004

(54) DRIVE MECHANISM AND DRIVE METHOD EMPLOYING CIRCUIT FOR GENERATING SAW-TOOTH WAVEFORM VOLTAGE

(75) Inventors: Tomoyuki Yuasa, Sakai (JP); Ryuichi Yoshida, Sakai (JP)

(73) Assignee: Minolta Co., Ltd., Osaka (JP)

( * ) Notice: Subject to any disclaimer, the term of this patent is extended or adjusted under 35 U.S.C. 154(b) by 156 days.

(21) Appl. No.: 10/266,706

(22) Filed: Oct. 9, 2002

(65) Prior Publication Data

US 2004/0007941 A1 Jan. 15, 2004

(30) Foreign Application Priority Data

Jul. 11, 2002 (JP) ......................................... 2002-202750

(51) Int. Cl.[7] ............................................. H01L 41/08
(52) U.S. Cl. ................... 310/317; 310/316.02; 318/116
(58) Field of Search .................. 310/316.01, 316.02, 310/316.03, 316–318

(56) References Cited

U.S. PATENT DOCUMENTS

| | | | | |
|---|---|---|---|---|
| 4,743,789 A | * | 5/1988 | Puskas ................... 310/316.01 |
| 5,179,311 A | * | 1/1993 | Suganuma ............. 310/316.02 |
| 5,245,242 A | * | 9/1993 | Hall ....................... 310/316.03 |
| 5,404,066 A | * | 4/1995 | Moriwaki et al. .......... 310/328 |
| 5,587,846 A | * | 12/1996 | Miyano et al. ............. 359/824 |
| 5,917,267 A | * | 6/1999 | Miyazawa et al. .......... 310/317 |
| 6,111,336 A | * | 8/2000 | Yoshida et al. ............. 310/328 |
| 6,218,764 B1 | | 4/2001 | Yoshida et al. |
| 6,218,765 B1 | * | 4/2001 | Kawabe ...................... 310/317 |
| 6,232,700 B1 | * | 5/2001 | Kosaka et al. ......... 310/323.17 |
| 6,320,298 B1 | | 11/2001 | Kawabe |
| 6,433,459 B1 | | 8/2002 | Okada |
| 6,483,226 B1 | * | 11/2002 | Okada ........................ 310/328 |
| 6,608,426 B2 | * | 8/2003 | Hayashi et al. ............. 310/317 |
| 6,703,762 B1 | * | 3/2004 | Okada ........................ 310/317 |
| 6,717,329 B2 | * | 4/2004 | Yoshida et al. ........ 310/316.02 |

FOREIGN PATENT DOCUMENTS

| | | |
|---|---|---|
| JP | 10-216462 | 8/1998 |
| JP | 2000-312474 | 11/2000 |
| JP | 2000-350482 | 12/2000 |
| JP | 2001-103772 | 4/2001 |
| JP | 2001-197756 | 7/2001 |
| JP | P2001-322099 A | 11/2001 |

* cited by examiner

*Primary Examiner*—Mark Budd
(74) *Attorney, Agent, or Firm*—McDermott Will & Emery LLP

(57) ABSTRACT

An actuator using a piezoelectric element. The actuator includes: the piezoelectric element, which is capacitive; an inductor; and a resistor. The piezoelectric element, the inductor and the resistor are serially arranged so as to define a serial circuit. When a suitable voltage is supplied to the serial circuit, a saw-tooth waveform voltage is applied to the piezoelectric element so that the piezoelectric element extends at a speed and compresses at a different speed repeatedly.

19 Claims, 10 Drawing Sheets

Fig.1A  PRIOR ART

WAVEFORM GENERATOR    POWER AMPLIFIER

Fig.1B  PRIOR ART
WAVEFORM OF FORWARD DIRECTION

Fig.1C  PRIOR ART
WAVEFORM OF BACKWARD DIRECTION

WAVEFORM OF
FORWARD DIRECTION

WAVEFORM OF
BACKWARD DIRECTION

← BACKWARD DIRECTION   FORWARD DIRECTION →

Fig.11A  $R=\frac{1}{0.5}\sqrt{\frac{L}{C}}$

Fig.11B  $R=\frac{1}{1.5}\sqrt{\frac{L}{C}}$

Fig.11C  $R=\frac{1}{2.5}\sqrt{\frac{L}{C}}$

Fig.11D  $R=\frac{1}{5}\sqrt{\frac{L}{C}}$

Fig.11E  $R=\frac{1}{10}\sqrt{\frac{L}{C}}$

Fig.11F  $R=\frac{1}{15}\sqrt{\frac{L}{C}}$

Fig.11G  $R=\frac{1}{20}\sqrt{\frac{L}{C}}$

DRIVE MECHANISM AND DRIVE METHOD EMPLOYING CIRCUIT FOR GENERATING SAW-TOOTH WAVEFORM VOLTAGE

This application is based upon application No. 2002-202750 filed in Japan, the contents of which are hereby incorporated by reference.

BACKGROUND OF THE INVENTION

1. Field of the Invention

The present invention relates to a drive mechanism, a drive method and a circuit employed therein. More specifically, the present invention relates to the circuit suitable for applying a saw-tooth waveform of a voltage to a capacitive load, the drive mechanism provided with the circuit, and the drive method employing the circuit.

2. Description of the Related Arts

Conventionally, there have been two manners of running a drive mechanism in which a saw-tooth waveform of voltage is applied to a piezoelectric element.

Figure 1A:
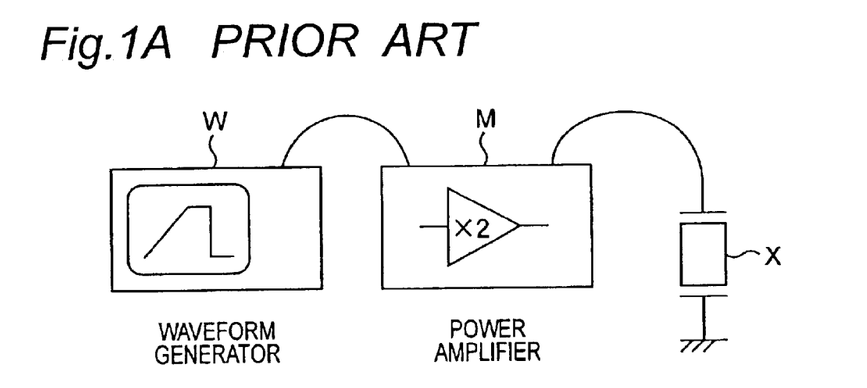
FIG. 1A is a schematic illustration showing a first conventional manner of running a drive mechanism.
Figure 1B:
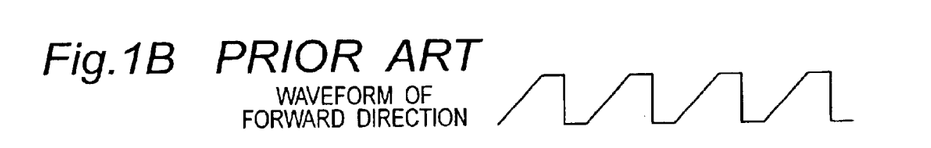
FIGS. 1B and 1C are waveform charts showing waveforms generated by the first conventional manner as shown in FIG. 1A.
Figure 1C:
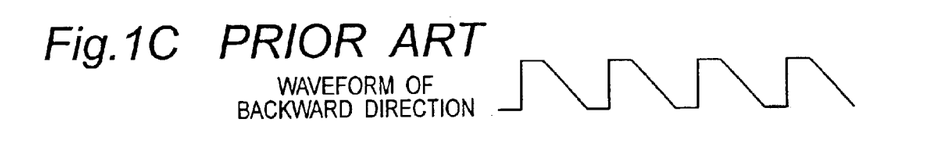

Referring to FIGS. 1A through 1C, the first manner of running the drive mechanism will be explained. As shown in FIG. 1A, a waveform generator W, specifically a digital-analog transducer therein, for example, of 8 bits and 1–5 volts type, generates a voltage having a saw-tooth waveform. The voltage having the saw-tooth waveform is amplified, for example, up to 1–10 volts, by an amplifier M, and then is applied to a piezoelectric element X in order to running the drive mechanism. By adjusting the waveform generator W, a waveform of forward direction as shown in FIG. 1B and a waveform of backward direction as shown in FIG. 2C can be generated.

Figure 2:
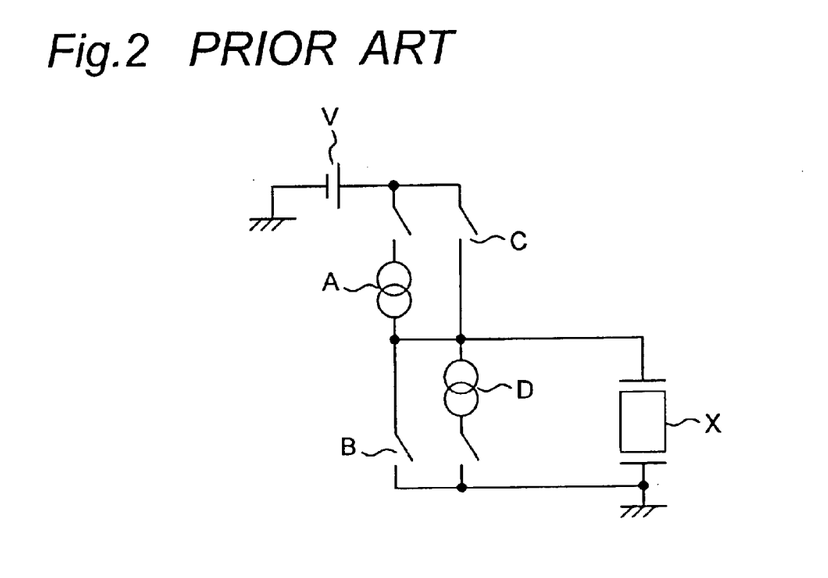
FIG. 2 is a circuit diagram showing a second conventional manner of running the drive mechanism.
Figure 3A:
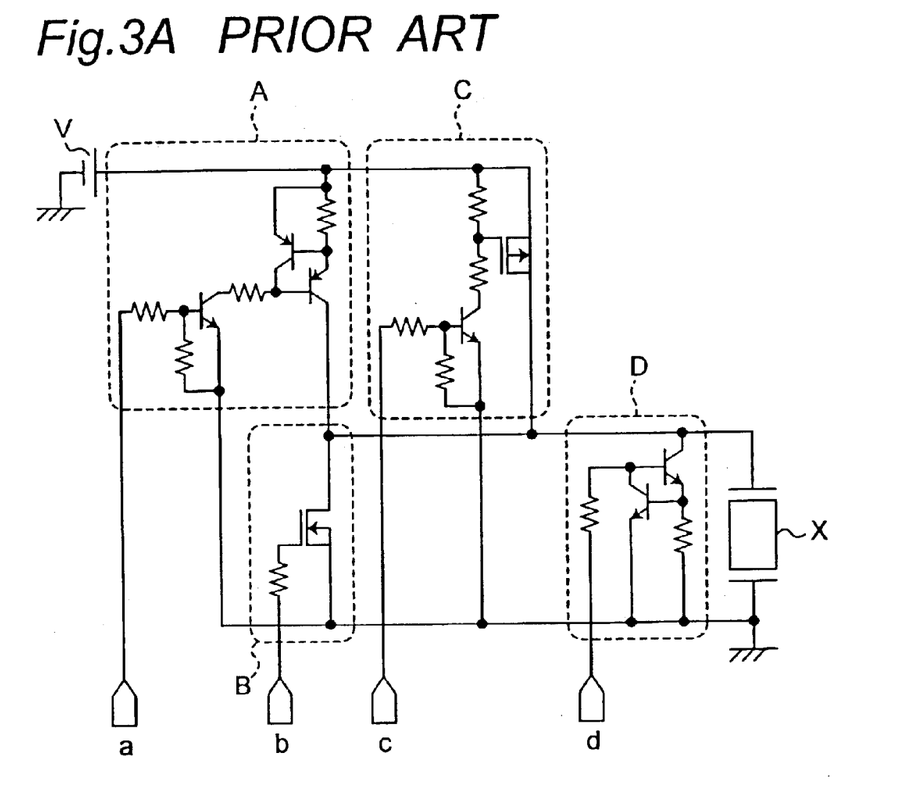
FIG. 3A is a detail circuit diagram of FIG. 2.
Figure 3B:
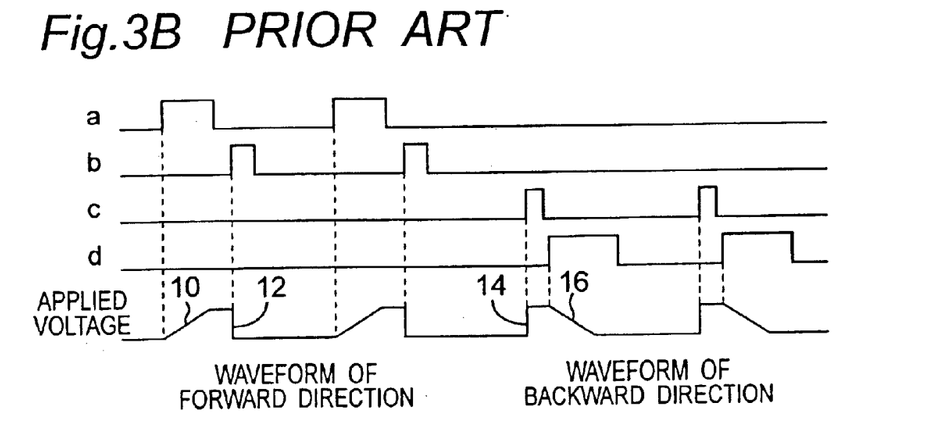
FIG. 3B is a set of timing charts as to the circuit diagram of FIG. 3A.

FIGS. 2, 3A and 3B show a second manner of running the drive mechanism. FIG. 2 shows a circuit for applying a power-supply voltage V to a piezoelectric element X. The circuit includes constant current circuits A, D and switching circuits B, C. The waveform of forward direction or the waveform of backward direction are generated by actuating the constant current circuit A and the switching circuit B alternately, or by actuating the constant current circuit D and the switching circuit C alternately.

For example, the circuit is constituted as shown in FIG. 3A. When control signals are input to terminals "a", "b", "c" and "d" of the circuit, the waveform of forward direction or the waveform of backward direction is generated, as shown in FIG. 3B.

Specifically, when the terminal "a" is supplied with Hi input, the voltage applied to a piezoelectric element X gradually increases through the constant current circuit A as shown by the reference numeral 10 in FIG. 3B. Next, when the terminal "b" is supplied with Hi input, the piezoelectric element X is grounded through the switch circuit B, so that the voltage applied to the piezoelectric element X rapidly decreases as shown by the reference numeral 12 in FIG. 3B. Thus, the waveform of forward direction is generated.

In the mean time, when the terminal "c" is supplied with Hi input, the piezoelectric element X is connected to the power supply voltage V through the switch circuit C, so that the voltage applied to the piezoelectric element X rapidly increases as shown by the reference numeral 14 in FIG. 3B. Then, when the terminal "d" is supplied with Hi input, the voltage applied to the piezoelectric element X gradually decreases through the constant current circuit D as shown by the reference numeral 16 in FIG. 3B. Therefore, the waveform of backward direction is generated.

In the first manner, the waveform generator W and the power amplifier M are needed. In the second manner, the constant current circuits A, D and the switch circuits B, C are needed. Thus, the construction of the circuit is complex and introduces high cost. Additionally, the waveform includes high-order harmonic waves, which are not needed, and causes undesirable influence upon the drive mechanism.

SUMMARY OF THE INVENTION

Accordingly, it is an object of the present invention to provide a drive mechanism, a drive method and a circuit employing a simple construction, in which a voltage having a saw-tooth waveform to be applied can be generated.

In order to achieve the above object, according to one aspect of the present invention, there is provided a drive mechanism, comprising: an electromechanical transducer operating as a capacitor and having a pair of terminals; an inductive element operating as an inductor and having a pair of terminals; and a resistive element operating as a resistor and having a pair of terminals, wherein the electromechanical transducer, the inductive element and the resistive element are connected by terminals thereof in series so as to constitute a series resonance circuit, and wherein a voltage having a saw-tooth waveform applied to the electromechanical transducer causes the electromechanical transducer to expand at a first velocity and to contract at a second velocity, different from the first velocity.

In the configuration, the electromechanical transducer (for example, electrostatic actuator, piezoelectric transducer, electrostriction transducer, magnetostriction transducer, and so on) changes the electrical energy (for example, electric voltage, electric current, electric field, electric charge, static electricity, magnetic field) supplied thereto into the mechanical energy (for example, transformation or strain such as prolonging, compressing, expanding, contracting, bending, twisting).

In the configuration, the transfer function of the series resonance circuit, which is a serial RLC circuit, includes a second-order lag element, and therefore a suitable waveform of the voltage applied to the series resonance circuit causes the saw-tooth or slant waveform of the voltage applied to the electromechanical transducer.

According to the configuration, it is possible to make parts of the circuit for generating a voltage applied to the electromechanical transducer less than that of conventional drive mechanisms. Thus, the voltage having the saw-tooth waveform applied to the electromechanical transducer can be generated, employing a simple construction.

As an embodiment, a voltage having a square waveform applied to the series resonance circuit generates the voltage having the saw-tooth waveform applied to the electromechanical transducer.

In the configuration, it is easy to apply the voltage having the square waveform so as to generate the voltage having the saw-tooth waveform applied to the electromechanical transducer.

As an embodiment, one of the terminals of the electromechanical transducer is connected to ground. The other of the terminals of the electromechanical transducer is connected to one of the terminals of the resistive element. The other of the terminals of the resistive element is connected to one of the terminals of the inductive element. The voltage having the square waveform applied to the other of the terminals of the inductive element generates the voltage having the saw-tooth waveform applied to the other of the terminals of the electromechanical transducer.

As an embodiment, an inequality of $$0.4 \times fr < fd < 1.0 \times fr \tag{1}$$

is satisfied, where fd is a frequency of the voltage having the square waveform applied to the series resonance circuit, and where fr is a resonance frequency of the series resonance circuit.

Preferably, an inequality of $$0.6 \times fr < fd < 0.8 \times fr \tag{2}$$

is satisfied.

As an embodiment, one of inequalities of $$0.05 < Du < 0.48 \text{ and } 0.52 < Du < 0.95 \tag{3}$$

is satisfied, where Du is a duty ratio of the voltage having the square waveform applied to the series resonance circuit.

Preferably, one of inequalities of $$0.15 < Du < 0.40 \text{ and } 0.60 < Du < 0.85 \tag{4}$$

is satisfied.

More preferably, one of inequalities of $$0.25 < Du < 0.35 \text{ and } 0.65 < Du < 0.75 \tag{5}$$

is satisfied.

As an embodiment, an inequality of $$(1/15) \times (L/C)^{1/2} < R < (L/C)^{1/2} \tag{6}$$

is satisfied, where C is a capacitance of the electromechanical transducer, where L is an inductance of the inductive element, and where R is a resistance of the resistive element.

Preferably, an inequality of $$(1/10) \times (L/C)^{1/2} < R < (1/1.5) \times (L/C)^{1/2} \tag{7}$$

is satisfied.

As an embodiment, the electromechanical transducer has a pair of ends in an expanding and contracting direction. The drive mechanism further comprises a drive member fixed to one of the ends of the electromechanical transducer; and a driven member which contacts frictionally with the drive member under a predetermined frictional force exerting therebetween. The voltage having the saw-tooth waveform applied to the electromechanical transducer causes the electromechanical transducer to expand at the first velocity and to contract at the second velocity, different from the first velocity, so as to move the driven member along with the drive member relatively.

According to the above embodiments, it is possible to generate a suitable waveform of the voltage applied to the electromechanical transducer for running the drive mechanism.

In order to achieve the above object, according to another aspect of the present invention, there is provided a drive method for running a drive mechanism which comprises: an electromechanical transducer operating as a capacitor and having a pair of terminals; an inductive element operating as an inductor and having a pair of terminals; and a resistive element operating as a resistor and having a pair of terminals, wherein the electromechanical transducer, the inductive element and the resistive element are connected by terminals thereof in series so as to constitute a series resonance circuit, the driving method comprising: a first step of applying a voltage to the series resonance circuit so as to generate a voltage having a saw-tooth waveform applied to the electromechanical transducer; and a second step of expanding the electromechanical transducer at a first velocity and contracting at a second velocity, different from the first velocity, by the voltage having the saw-tooth waveform applied to the electromechanical transducer generated at the first step.

In the configuration, the electromechanical transducer (for example, electrostatic actuator, piezoelectric transducer, electrostriction transducer, magnetostriction transducer, and so on) changes the electrical energy (for example, electric voltage, electric current, electric field, electric charge, static electricity, magnetic field) supplied thereto into the mechanical energy (for example, transformation or strain such as prolonging, compressing, expanding, contracting, bending, twisting).

In the configuration, the transfer function of the series resonance circuit, which is a serial RLC circuit, includes a second-order lag element, and therefore a suitable waveform of the voltage applied to the series resonance circuit causes the saw-tooth or slant waveform of the voltage applied to the electromechanical transducer.

According to the configuration, it is possible to make parts of the circuit for generating a voltage applied to the electromechanical transducer less than that of conventional drive mechanisms. Thus, the voltage having the saw-tooth waveform applied to the electromechanical transducer can be generated, employing a simple construction.

As an embodiment, the voltage having a square waveform is applied to the series resonance circuit to perform the first step.

In the configuration, it is easy to apply the voltage having the square waveform so as to generate the voltage having the saw-tooth waveform on the electromechanical transducer.

As an embodiment, one of the terminals of the electromechanical transducer is connected to ground. The other of the terminals of the electromechanical transducer is connected to one of the terminals of the resistive element. The other of the terminals of the resistive element is connected to one of the terminals of the inductive element. The voltage having the square waveform is applied to the other of the terminals of the inductive element so as to generate the voltage having the saw-tooth waveform applied to the other of the terminals of the electromechanical transducer to perform the first step.

As an embodiment, an inequality of $$0.4 \times fr < fd < 1.0 \times fr \tag{1'}$$

is satisfied, where fd is a frequency of the voltage having the square waveform applied to the series resonance circuit, and where fr is a resonance frequency of the series resonance circuit.

Preferably, an inequality of $$0.6 \times fr < fd < 0.8 \times fr \tag{2'}$$

is satisfied.

As an embodiment, one of inequalities of $$0.05 < Du < 0.48 \text{ and } 0.52 < Du < 0.95 \tag{3'}$$

is satisfied, where Du is a duty ratio of the voltage having the square waveform applied to the series resonance circuit.

Preferably, one of inequalities of $$0.15 < Du < 0.40 \text{ and } 0.60 < Du < 0.85 \tag{4'}$$

is satisfied.

More preferably, one of inequalities of $$0.25 < Du < 0.35 \text{ and } 0.65 < Du < 0.75 \quad (5')$$

is satisfied.

As an embodiment, an inequality of $$(1/15) \times (L/C)^{1/2} < R < (L/C)^{1/2} \quad (6')$$

is satisfied, where C is a capacitance of the electromechanical transducer, where L is an inductance of the inductive element, and where R is a resistance of the resistive element.

Preferably, an inequality of $$(1/10) \times (L/C)^{1/2} < R < (1/1.5) \times (L/C)^{1/2} \quad (7')$$

is satisfied.

As an embodiment, the electromechanical transducer have a pair of ends in an expanding and contracting direction. The drive mechanism further comprises: a drive member fixed to one of the ends of the electromechanical transducer; and a driven member which contacts frictionally with the drive member under a predetermined frictional force exerting therebetween. The second step of expanding the electromechanical transducer at the first velocity and contracting at the second velocity, different from the first velocity, is carried out so as to move the driven member along with the drive member.

According to the above embodiments, it is possible to generate a suitable waveform of the voltage applied to the electromechanical transducer for running the drive mechanism.

In order to achieve the above object, according to still another aspect of the present invention, there is provided a circuit for generating a voltage having a saw-tooth waveform, comprising: an capacitance element operating as a capacitor and having a pair of terminals; an inductive element operating as an inductor and having a pair of terminals; and a resistive element operating as a resistor and having a pair of terminals, wherein the capacitance element, the inductive element and the resistive element are connected by terminals thereof in series so as to constitute a series resonance circuit, and wherein a voltage having a square waveform applied to the series resonance circuit generates the voltage having the saw-tooth waveform applied to the capacitance element.

In the configuration, the transfer function of the series resonance circuit, which is a serial RLC circuit, includes a second-order lag element, and therefore a suitable waveform of the voltage applied to the series resonance circuit generates the saw-tooth or slant waveform of the voltage applied to the capacitive element.

According to the configuration, it is possible to make parts of the circuit for generating a voltage applied to the capacitive element less than that of conventional drive mechanisms. Thus, the voltage having the saw-tooth waveform applied to the capacitive element can be generated, employing a simple construction.

As an embodiment, one of the terminals of the capacitance element is connected to ground. The other of the terminals of the capacitance element is connected to one of the terminals of the resistive element. The other of the terminals of the resistive element is connected to one of the terminals of the inductive element. The voltage having the square waveform applied to the other of the terminals of the inductive element generates the voltage having the saw-tooth waveform applied to the other of the terminals of the capacitance element.

As an embodiment, an inequality of $$0.4 \times fr < fd < 1.0 \times fr \quad (1'')$$

is satisfied, where fd is a frequency of the voltage having the square waveform applied to the series resonance circuit, and where fr is a resonance frequency of the series resonance circuit.

Preferably, an inequality of $$0.6 \times fr < fd < 0.8 \times fr \quad (2'')$$

is satisfied.

As an embodiment, one of inequalities of $$0.05 < Du < 0.48 \text{ and } 0.52 < Du < 0.95 \quad (3'')$$

is satisfied, where Du is a duty ratio of the voltage having the square waveform applied to the series resonance circuit.

Preferably, one of inequalities of $$0.15 < Du < 0.40 \text{ and } 0.60 < Du < 0.85 \quad (4'')$$

is satisfied.

More preferably, one of inequalities of $$0.25 < Du < 0.35 \text{ and } 0.65 < Du < 0.75 \quad (5'')$$

is satisfied.

As an embodiment, an inequality of $$(1/15) \times (L/C)^{1/2} < R < (L/C)^{1/2} \quad (6'')$$

is satisfied, where C is a capacitance of the electromechanical transducer, where L is an inductance of the inductive element, and where R is a resistance of the resistive element.

Preferably, an inequality of $$(1/10) \times (L/C)^{1/2} < R < (1/1.5) \times (L/C)^{1/2} \quad (7'')$$

is satisfied.

According to the above embodiments, it is possible to generate a suitable waveform of the voltage applied to the capacitive element for actuating the capacitive element.

BRIEF DESCRIPTION OF THE DRAWINGS

This and other objects and features of the present invention will become clear from the following description taken in conjunction with the preferred embodiment thereof with reference to the accompanying drawings.

DETAILED DESCRIPTION OF THE PREFERRED EMBODIMENT

Before the description of the preferred embodiment according to the present invention proceeds, it is to be noted that like or corresponding parts are designated by like reference numerals or characters throughout the accompanying drawings.

A detailed description is made below upon a drive mechanism of the preferred embodiment, with reference to FIG. 4 through FIG. 14.

FIGS. 4A through 4D show the operation principal of the drive mechanism.

Figure 4A:
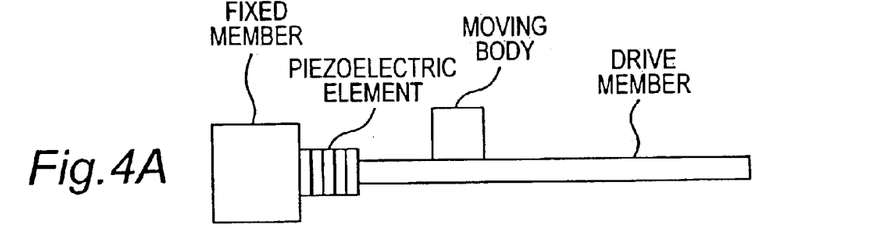
FIGS. 4A through 4C are schematic illustrations of a driving mechanism according to an embodiment of the present invention.
Figure 4B:
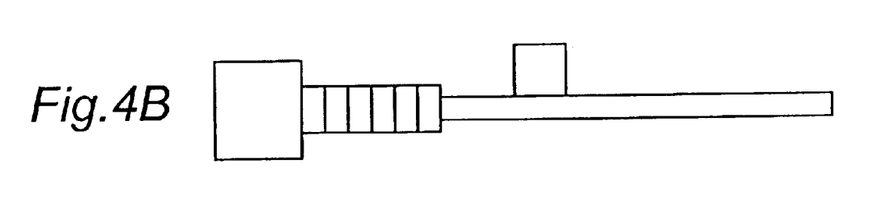
Figure 4C:
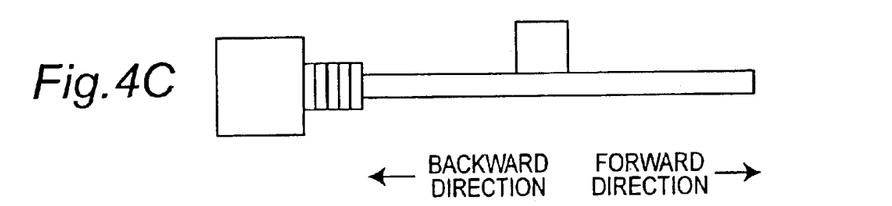

As shown in FIGS. 4A through 4C, one end of a piezoelectric element in an extending and contracting direction is connected to a fixed member. The other end of the piezoelectric element in the same direction is connected to a drive member. The drive member moves in forward direction and backward direction, when the piezoelectric element extends or contacts. A moving body is engaged with the drive member by a frictional force.

The moving body is driven when a voltage having a saw-tooth waveform is applied to the piezoelectric element so as to cause the piezoelectric element to extend at a first velocity, and to contract at a second velocity, different from the first velocity. FIGS. 4A, 4B and 4C show respective states at points of time indicated by the reference characters A, B and C in FIG. 4D.

Figure 4D:
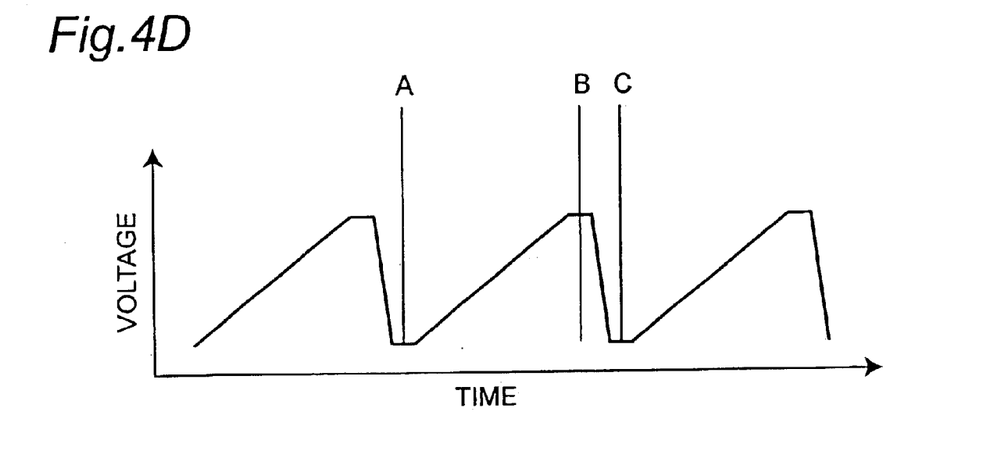
FIG. 4D is a waveform chart of a voltage applied to a piezoelectric element in the driving mechanism as shown in FIGS. 4A through 4C.

When the voltage gradually increases during a section A–B as shown in FIG. 4D, the piezoelectric element relatively slowly extends so that the state as shown in FIG. 1A changes into the state as shown in FIG. 4B. At the time, the moving body slides little, or it does not slide with respect to the drive member, and therefore the moving body moves together with the drive member substantially.

Secondly, when the voltage abruptly decreases during a section B–C as shown in FIG. 4D, the piezoelectric element contracts relatively fast so that the drive member returns to an initial position. At the time, the moving body stays at the present position substantially, and the moving body slides with respect to the drive member. Therefore, only the drive member returns to the initial position. AS the result, the moving body moves from the initial position as shown in FIG. 4A to a forward position as shown in FIG. 4C.

Repeating such a cycle, the moving body moves along the drive member in a forward direction.

In the mean time, the moving body moves in a backward direction, when a waveform having a rapidly increasing part and a gradually decreasing part is applied to the piezoelectric element.

Figures 5A, 5B:
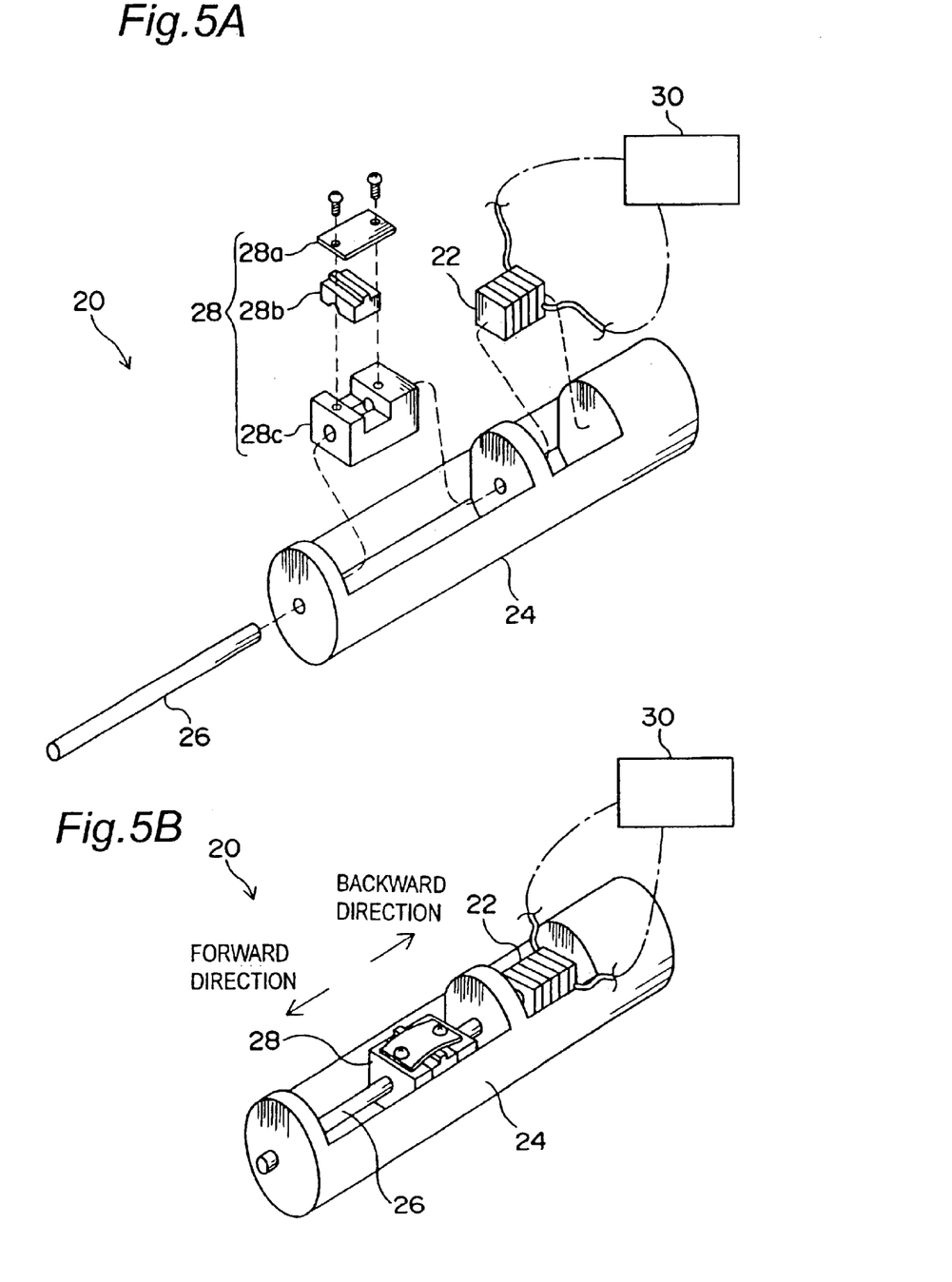
FIG. 5A is a schematic exploded view of the drive mechanism according to the embodiment of the present invention.
FIG. 5B is a perspective view of the drive mechanism.

FIGS. 5A and 5B show a specific construction of the drive mechanism 20 according to the embodiment of the present invention. FIG. 5A is an exploded view of the drive mechanism 20, and FIG. 5B is a perspective view of its assembled drive mechanism 20.

The drive mechanism 20 comprises a fixed member 24, a piezoelectric element 22, a drive rod 26 and a driven unit 28. The fixed member 24 is fixed to a stationary member of an unshown apparatus (for example, a base of an XY-table). The piezoelectric element 22 is, for example, of a laminated type. The drive rod 26 is slidably supported by the fixed member 24. The drive unit 28 is connected to a driven part (not shown) such as a stage in the XY-table. One end of the piezoelectric element 22 in an extending and contracting direction is fixed to an end of the fixed member 24, and the other end of the piezoelectric element 22 in the extending and contracting direction is fixed to an end of the drive rod 26. The drive unit 28, including a slider 28c, a contact member 28b, and a spring plate 28a, is engaged with the drive rod 26 by a frictional force so as to be able to slide along the drive rod 26. When the voltage having the saw-tooth waveform is applied to the piezoelectric element 22 of the drive mechanism 20 so as to cause the drive rod 26 to vibrate axially, the drive unit 28 moves along the drive rod 26 in a desired direction.

That is, the piezoelectric element 22 performs as an electromechanical transducer, a drive rod 26 performs as a drive member, and the drive unit 28 performs as a moving body or an engaging member.

Figure 6A:
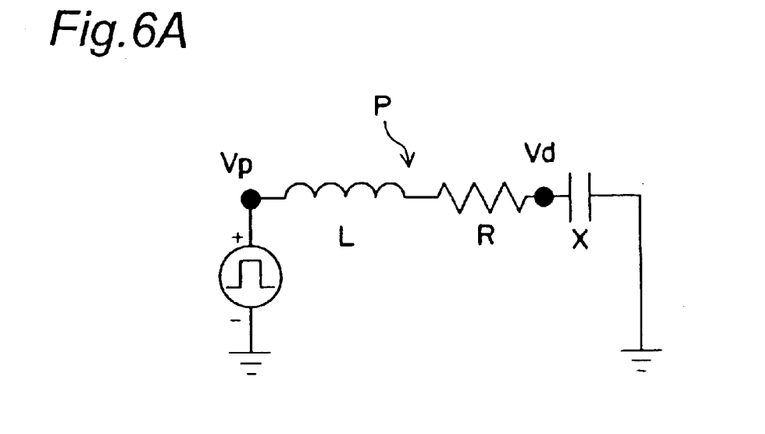
FIG. 6A is a schematic circuit diagram of a series resonance circuit arranged in the drive mechanism.
Figure 6B:
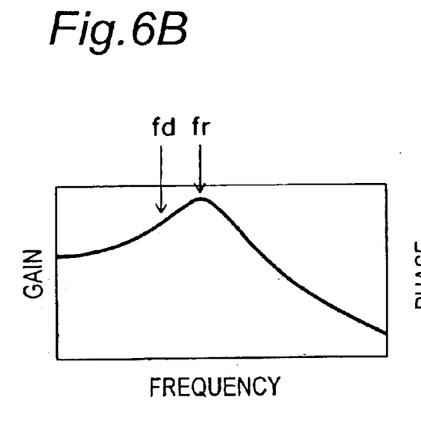
FIGS. 6B and 6C are transfer characteristic graphs of the series resonance circuit.
Figure 6C:
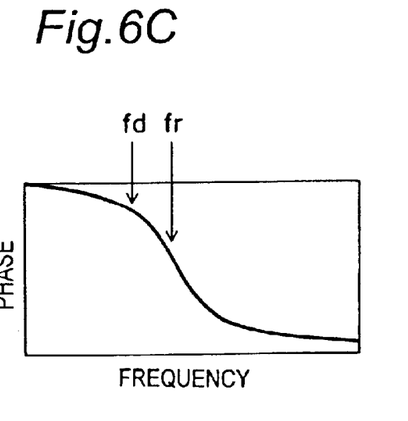

Referring to FIGS. 6A through 6C, a circuit for generating a voltage to drive the drive mechanism 20 will be explained.

As shown in FIG. 6A, a capacitive load X (corresponding to the piezoelectric element 22 of the drive mechanism 20), a resistive element R, and a inductive element L are connected in series so as to constitute a series resonance circuit P. Specifically, one terminal of the capacitive load X is grounded and the other terminal thereof, a voltage of which is designated as Vd, is connected to one terminal of the resistive element R. The other terminal of the resistive element R is connected to one terminal of the inductive element L. A voltage supplied to the series resonance circuit P, or to the other terminal of the inductive element L is designated as Vp.

FIGS. 6B and 6C show the transfer characteristic from Vp to Vd in the series resonance circuit P. The reference character fr in the figures designates a resonance frequency of the series resonance circuit P.

Figure 6D:
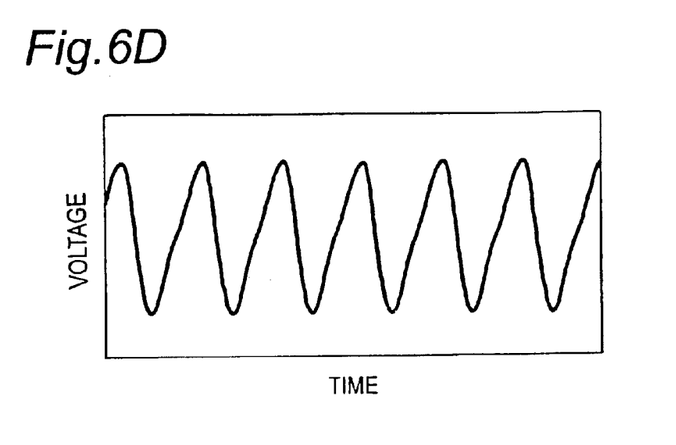
FIG. 6D is a waveform chart of a voltage at a capacitive element.

FIG. 6D shows an example of a waveform of the voltage Vd at the capacitive load X, when a square waveform of the voltage Vp, or the voltage Vp having a square waveform, is applied to the series resonance circuit P. At the time, the frequency of the voltage Vp is shown by the reference character fd in FIGS. 6B and 6C. Such a frequency fd is 0.7 times resonance frequency fr (fd=0.7×fr), and the duty ratio of the square waveform of the voltage Vp is 0.3.

Expressing the waveform of the voltage Vp by Fourier series, the gain of the secondary wave is about half of that of the primary wave, and the phase of the secondary wave delays or lags with respect to the primary wave, according to the transfer characteristic as shown in FIGS. 6B and 6C. The gain of the tertiary wave or high-order wave is attenuated significantly. Thus, supplying the square waveform of the voltage Vp, the waveform of the voltage Vd between the terminals of the capacitive load X is consisted nearly of the primary wave and the secondary wave, and has a saw-tooth waveform as shown in FIG. 6D.

Figure 7:
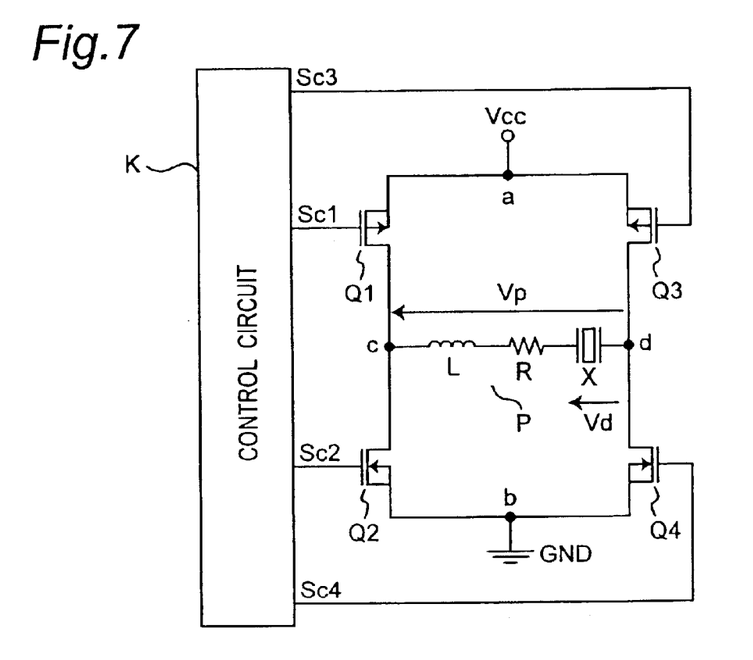
FIG. 7 is a detail circuit diagram including the series resonance circuit.

FIG. 7 shows a circuit of the drive mechanism 20.

The circuit comprises four switching elements Q1, Q2, Q3 and Q4, the inductive element L, and the resistive element R, which are arranged to apply the voltage between the terminals of the capacitive load X (or the piezoelectric element 22).

Each of the switching elements Q1, Q2, Q3 and Q4 is MOSFET (metal oxide semiconductor field effect transistor), and gates thereof are connected to terminals Sc1, Sc2, Sc3 and Sc4 of a control circuit K. The switching elements Q1 and Q3 are of the p channel type, and the switching elements Q2 and Q4 are of the n channel type.

A source of the switching elements Q1 and a source of the switching elements Q3 are connected by a connecting point "a" to a power source Vcc. A drain of the switching elements Q1 is connected to a drain of the switching elements Q2 through a connecting point "c". A drain of the switching elements Q3 is connected to a drain of the switching elements Q4 through a connecting point "d". A source of the switching elements Q2 and a source of the switching elements Q4 are connected by a connecting point "b" to ground.

The capacitive load X is connected in series with the inductive element L and a resistive element R between the connecting points "c" and "d" so as to constitute the resonance circuit therebetween.

Figures 8A, 8B, 8C:
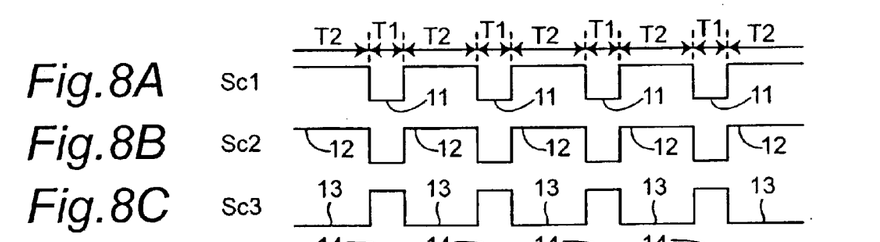
FIGS. 8A through 8F are a set of timing charts as to the detail circuit diagram as shown in FIG. 7.
Figures 8D, 8E:
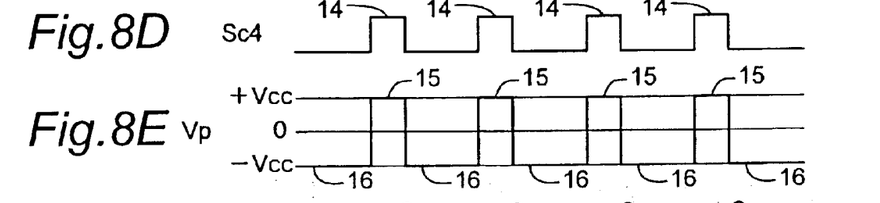
Figure 8F:
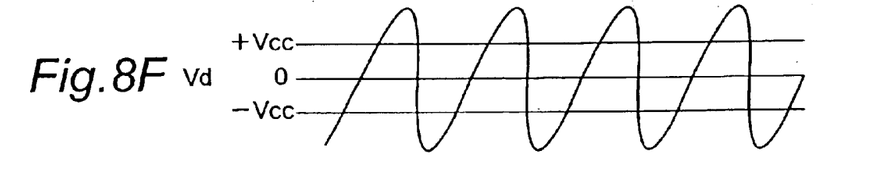
Figure 9A:
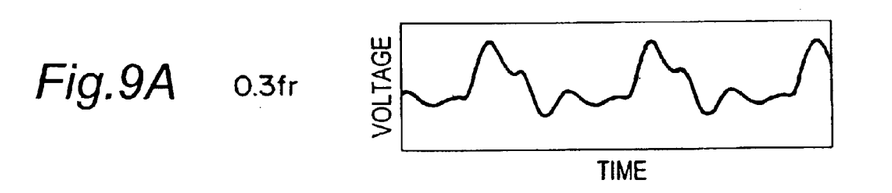
FIGS. 9A through 9E are waveform charts of a voltage at a piezoelectric element.
Figure 9B:
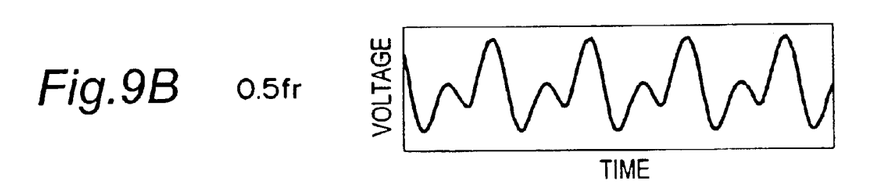
Figure 9C:
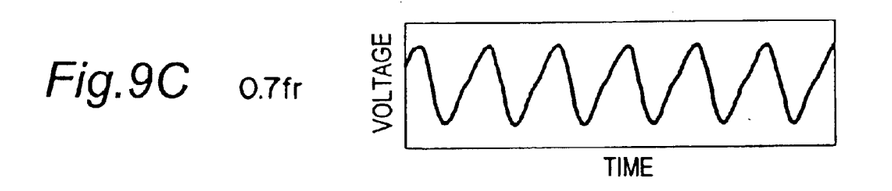
Figure 9D:
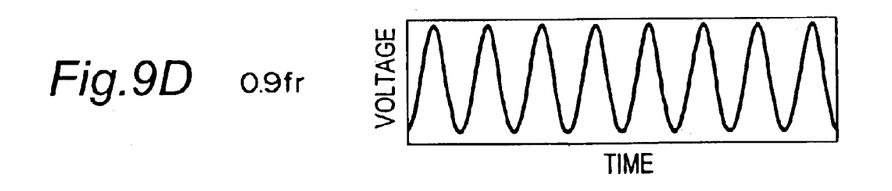
Figure 9E:
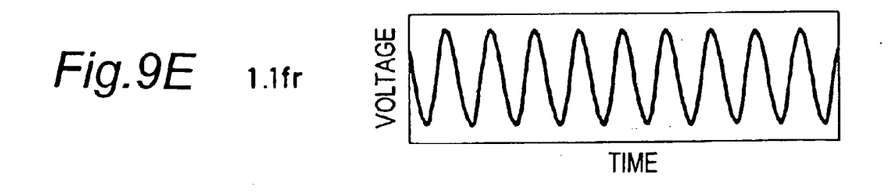

FIGS. 8A through 8F are a set of timing charts, which show operation of the control circuit K. FIGS. 8A through 8D show respective voltages at the terminals Sc1–Sc4 of the control circuit K, that is, respective voltages of the gates of the switching elements Q1–Q4. FIG. 8E shows a voltage Vp of the resonance circuit P. FIG. 8F shows a voltage Vd between the terminals of the capacitive load X.

Low signal of the terminals Sc1, Sc3, indicated by reference numerals 11, 13, causes the switching elements Q1, Q3 to be on, that is, to become conductive, since the switching elements Q1, Q3 are the p channel type of FET. High signal of the terminals Sc2, Sc4, indicated by reference numerals 12, 14, causes the switching elements Q2, Q4 to be on, that is, to become conductive, since the switching elements Q2, Q4 are the n channel type of FET.

The control circuit K repeats a cycle consisting of periods T1 and T2.

During the period T1, the terminals Sc1, Sc2 are in the state of low signal, and the terminals Sc3, Sc4 are in the state of high signal, so that the switching elements Q2, Q3 are off or in an open state and the switching elements Q1, Q4 are on or in a close state. Thereby, the connecting point "c", or one end of the resonance circuit P is connected by the switching element Q1 to the source power Vcc, and the connecting point "d", or the other end of the resonance circuit P is connected by the switching element Q4 to the ground. Thus, the voltage Vp across the resonance circuit P is +Vcc as shown by the reference numeral 15 in FIG. 8E. A positive direction of the voltage Vp is indicated by a direction of an arrow in FIG. 7.

During the period T2, the terminals Sc1, Sc2 are in the state of high signal, and the terminals Sc3, Sc4 are in the state of low signal, so that the switching elements Q1, Q4 are off or in an open state and that the switching elements Q2, Q3 are on or in a close state. Thereby, the connecting point "c" is connected by the switching element Q2 to the ground, and the connecting point "d" is connected by the switching element Q3 to the power source Vcc. Thus, the voltage Vp across the resonance circuit P is −Vcc as shown by the reference numeral 16 in FIG. 8E.

As shown in FIG. 8E, the waveform of the voltage Vp across the resonance circuit P is square. Corresponding to such a square waveform, the waveform of the voltage Vd at the capacitive load X is, for example, in the general shape of saw-tooth as shown in FIG. 8F.

Referring to FIGS. 9–14, the frequency fd and the duty ratio Du of the square waveform of the voltage Vp applied to the series resonance circuit P, and the values of the elements in the series resonance circuit P will be explained.

First, the frequency fd of the square waveform of the voltage Vp applied to the series resonance circuit P will be explained, referring to FIGS. 9 and 12.

FIGS. 9A through 9E show a set of waveforms of the voltage Vd at the capacitive load X (or the piezoelectric element 22) for the variation of the frequency fd, that is, from 0.3 to 1.1 times resonance frequency fr, on condition that the duty ratio of the square waveform of the voltage Vp is 0.3 (Du=0.3), the inductance of the inductive element L is 100 micro-henries (L=100 $\mu$H), the resistance of the resistive element R is 23 ohms (R=23 $\Omega$), the capacitance of the capacitive load X (or the piezoelectric element 22) is 30 nano-farads (C=30 nF), concerning the circuit as shown in FIG. 7. FIG. 12 shows the velocity of the moving body or the drive unit 28 of the drive mechanism 20 in such a state. The reference character fr indicates the resonance frequency of the resonance circuit P, hereinafter.

Figure 12:
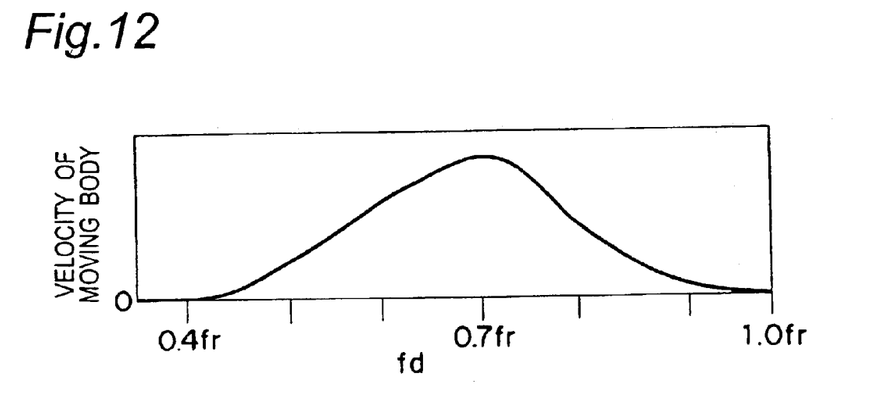
FIG. 12 is a graph showing a relationship between the velocity of a moving body and a frequency.

Referring to FIG. 12, the moving body moves fastest when the frequency fd is 0.7 time resonance frequency fr. It is because the difference between the sliding amount of the moving body during the expanding time of the capacitive element X (or the piezoelectric element 22) and that during the compressing time thereof is maximum. When the frequency fd is equal to the resonance frequency fr, it is not possible to move the moving body. At the time, the waveform of the voltage Vd is nearly a sine curve, and therefore there is no or little difference between the sliding amount of the moving body during the expanding time of the capacitive element X (or the piezoelectric element 22) and that during the compressing time thereof. When the frequency fd is not greater than 0.4 times resonance frequency fr, it is not possible to move the moving body. FIG. 12 provides a practical or preferable range of the frequency fd from 0.6 to 0.8 times resonance frequency fr.

As a result, the preferable range of the frequency fd can be expressed in an inequality form as:

$$0.4 \times fr < fd < 1.0 \times fr \quad (8)$$

The more preferable range thereof can be expressed in an inequality form as:

$$0.6 \times fr < fd < 0.8 \times fr \quad (9)$$

Second, the duty ratio Du of the square waveform of the voltage Vp applied to the series resonance circuit P will be explained, referring to FIGS. 10 and 13.

FIGS. 10A through 10G show a set of waveforms of the voltage Vd at the capacitive load X (or the piezoelectric element 22) for the variation of the duty ratio Du, that is, from 0.05 to 0.95, on condition that the frequency fd is 0.7 times resonance frequency fr (fd=0.7×fr), the inductance of the inductive element L is 100 micro-henries (L=100 μH), the resistance of the resistive element R is 23 ohms (R=23 Ω), and the capacitance of the capacitive load X (or the piezoelectric element 22) is 30 nano-farads (C=30 nF), concerning the circuit shown in FIG. 7. FIG. 13 shows the velocity of the moving body or the drive unit 28 in the drive mechanism 20 in such a state.

Figure 10A:
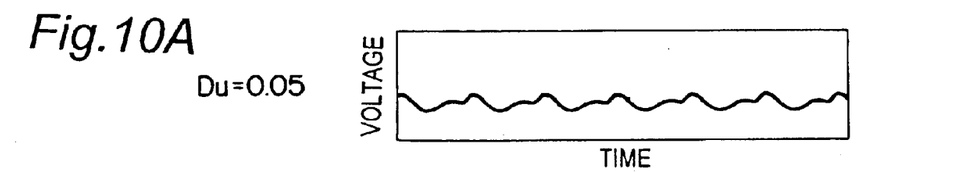
FIGS. 10A through 10G are waveform charts of a voltage at the piezoelectric element.
Figure 10B:
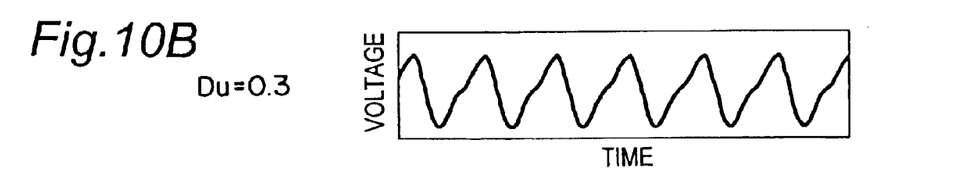
Figure 10C:
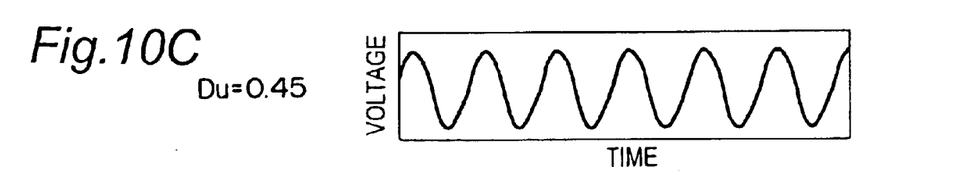
Figure 10D:
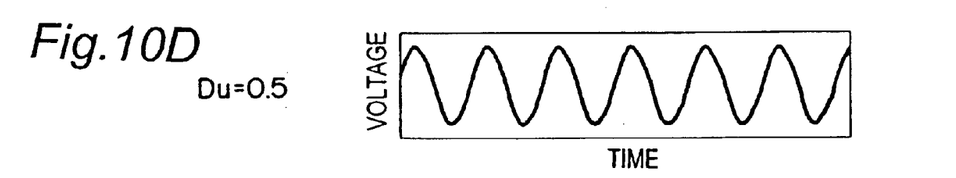
Figure 10E:
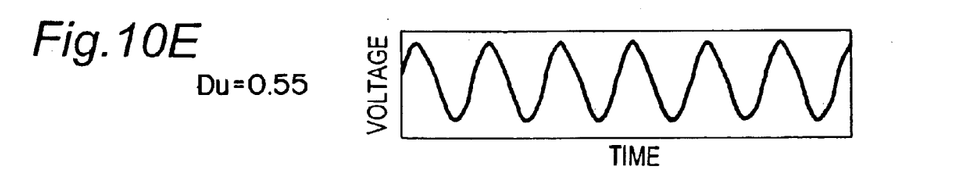
Figure 10F:
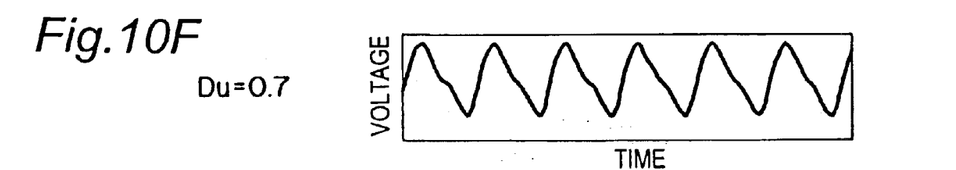
Figure 10G:
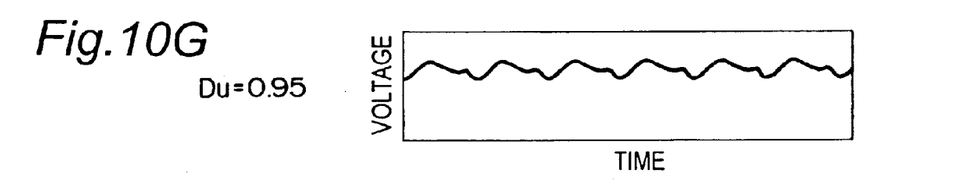
Figure 11A:
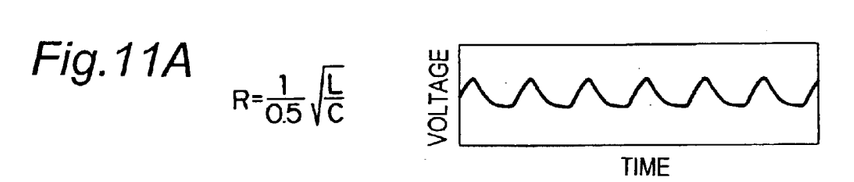
FIGS. 11A through 11G are waveform charts of a voltage at the piezoelectric element.
Figure 11B:
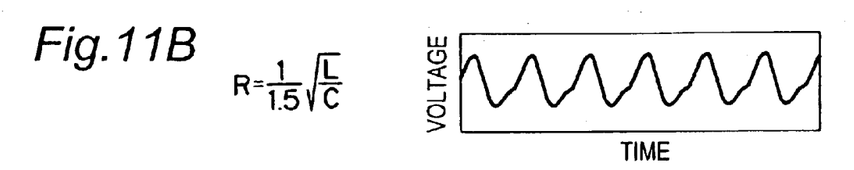
Figure 11C:
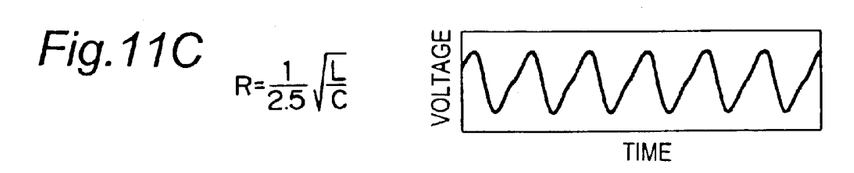
Figure 11D:
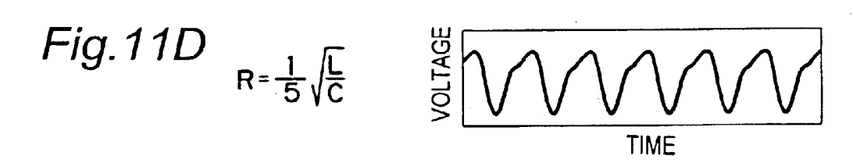
Figure 11E:
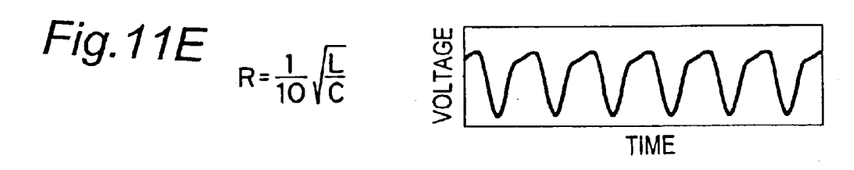
Figure 11F:
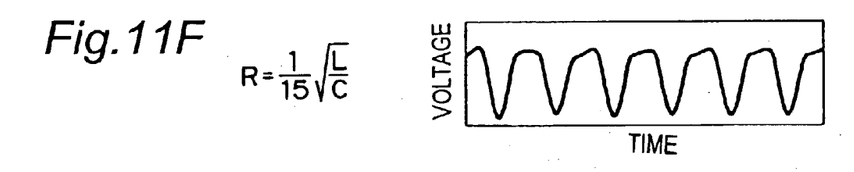
Figure 11G:
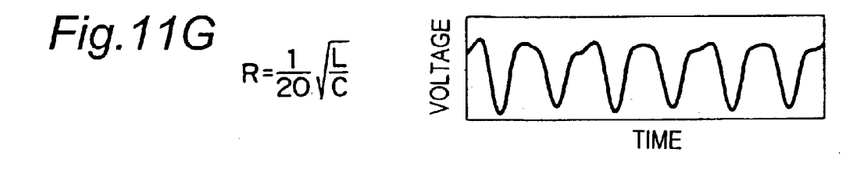
Figure 13:
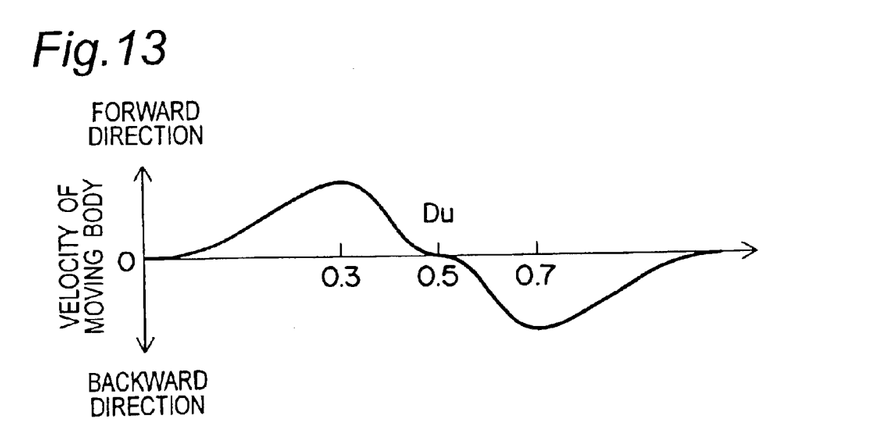
FIG. 13 is a graph showing a relationship between the velocity of a moving body and a duty ratio.

Referring to FIG. 13, the velocity of the moving body in forward direction is maximum when the duty ratio Du is 0.3, and the velocity of the moving body in backward direction is maximum when the duty ratio Du is 0.7. When the duty ratio Du is near to 0.5, that is, not less than 0.48 and not greater than 0.52 (0.48≦Du≦0.52), the waveform of the voltage Vd is nearly a sine curve as shown in FIG. 10D. Therefore, it is not possible to move the moving body. When the duty ratio Du is 0.05 or 0.95 (Du=0.05, 0.95), the voltage Vd is damped so significantly as shown in FIG. 10A or 10G, that it is not possible to move the moving body. Referring to FIG. 13, a practical range of the duty ratio Du is 0.15–0.40 and 0.60–0.85, more preferably, 0.25–0.35 and 0.65–0.75.

Therefore, the preferable range of the duty ratio Du can be expressed in an inequality form as:

$$0.05 < Du < 0.95 \tag{10}$$

The more preferable range thereof can be expressed in an inequality form as:

$$0.15 < Du < 0.4, \; 0.6 < Du < 0.85 \tag{11}$$

The further more preferable range thereof can be expressed in inequality form as:

$$0.25 < Du < 0.35, \; 0.65 < Du < 0.75 \tag{12}$$

Finally, the values of the elements in the series resonance circuit P will be explained, referring to FIGS. 11 and 14.

The frequency of the voltage at the capacitive load X (or the piezoelectric element) equals the frequency fd of the square waveform of the voltage Vp applied to the series resonance circuit P, and can be expressed in a form of coefficient times resonance frequency fr of the series resonance circuit P, as described in the above inequalitys (8) and (9). The resonance frequency fr is determined by the inductance L of the inductive element L and the capacitance C of the capacitive load X in the series resonance circuit P. Therefor, the resistance R is varied, on the condition that the inductance L and capacitance C are constant, hereinafter.

FIGS. 11A through 11G show a set of waveforms of the voltage Vd at the capacitive element (or the piezoelectric element 22) for the variation of the resistance R, that is, from 1/20 times of the squarer root of (L divided by C) to 1/0.5 times thereof, on condition that the frequency fd of the voltage Vp is 0.7 time of the resonance frequency fr (fd= 0.7×fr), the duty ratio Du of the square waveform of the voltage Vp is 0.3 (Du=0.3), the inductance L of the inductive element L is 100 micro-henries (L=100 μH), the capacitance C of the capacitive load X (or the piezoelectric element 22) is 30 nano-Farad (C=30 nF), concerning the circuit as shown in FIG. 7. FIG. 14 shows the velocity of the moving body in such a state.

Figure 14:
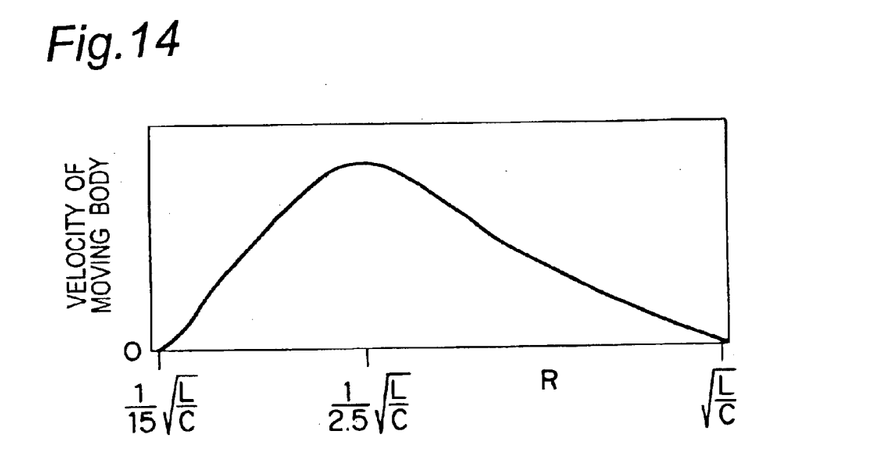
FIG. 14 is a graph showing a relationship between the velocity of a moving body and a resistance of the resistive element.

Referring to FIG. 14, the velocity of the moving body is maximum when the resistance R is 1/2.5 times of the squarer root of (L divided by C), that is, R=(1/2.5)×√(L/C). It is not possible to move the moving body, when the resistance R is 1/20 times of the squarer root of (L divided by C), and 1/0.5 times thereof, that is, R=(1/20)×√(L/C), and R=(1/0.5)× √(L/C). It is possible to move the moving body, when the resistance R is (1/15) and 1 times of the squarer root of (L divided by C), that is, R=(1/50)×√(L/C) and R=√(L/C). A practical range of the resistance R is (1/10)–(1/1.5) times squarer root of (L divided by C).

Therefore, it is preferable that the values of the elements in the series resonance circuit P meet an inequality as follows:

$$(1/15) \times (L/C)^{1/2} < R < (L/C)^{1/2} \tag{13}$$

More preferably, the values meet an inequality as follows:

$$(1/10) \times (L/C)^{1/2} < R < (1/1.5) \times (L/C)^{1/2} \tag{14}$$

As described above, FIGS. 9–12 show that the drive mechanism 20 can be driven when the voltage having the saw-tooth waveform Vd is applied to the capacitive load X (or the piezoelectric element 22). The saw-tooth waveform of the voltage Vd is generated by the circuit as shown FIGS. 7 and 8. The circuit includes the series resonance circuit P, and is constructed simply.

Although the present invention has been fully described about the preferred embodiment thereof with reference to the accompanying drawings, it is to be noted that various changes and modifications are also apparent to those skilled in the art.

For example, the present invention can be applied not only to the above element-fixed type of the drive mechanism employing electromechanical transducer, but various other types thereof such as a drive member fixed type, a moving body or engaging member fixed type, self-propelled type.

The circuit which generates the voltage having the saw-tooth waveform according to the present invention can be used not only for the drive mechanisms, but also for the other apparatus or devices, for example, a micro-pomp described in Japanese Laid-Open Patent Publication No. 2001–322099.

What is claimed is:

1. A drive mechanism, comprising:
an electromechanical transducer operating as a capacitor and having a pair of terminals;
an inductive element operating as an inductor and having a pair of terminals; and
a resistive element operating as a resistor and having a pair of terminals, wherein the electromechanical transducer, the inductive element and the resistive element are connected by terminals thereof in series so as to constitute a series resonance circuit, and wherein a voltage having a saw-tooth waveform applied to the electromechanical transducer causes the electromechanical transducer to expand at a first velocity and to contract at a second velocity, different from the first velocity.

2. A drive mechanism as claimed in claim 1, wherein a voltage having a square waveform applied to the series resonance circuit generates the voltage having the saw-tooth waveform applied to the electromechanical transducer.

3. A drive mechanism as claimed in claim 2, wherein one of the terminals of the electromechanical transducer is connected to ground, wherein the other of the terminals of the electromechanical transducer is connected to one of the terminals of the resistive element, wherein the other of the terminals of the resistive element is connected to one of the terminals of the inductive element, and wherein the voltage having the square waveform applied to the other of the terminals of the inductive element generates the voltage having the saw-tooth waveform applied to the other of the terminals of the electromechanical transducer.

4. A drive mechanism as claimed in claim 2, wherein an inequality of $$0.4 \times fr < fd < 1.0 \times fr$$

is satisfied, where fd is a frequency of the voltage having the square waveform applied to the series resonance circuit, and where fr is a resonance frequency of the series resonance circuit.

5. A drive mechanism as claimed in claim 2, wherein one of inequalities of $$0.05 < Du < 0.48 \text{ and } 0.52 < Du < 0.95$$

is satisfied, where Du is a duty ratio of the voltage having the square waveform applied to the series resonance circuit.

6. A drive mechanism as claimed in claim 2, wherein an inequality of $$(1/15) \times (L/C)^{1/2} < R < (L/C)^{1/2}$$

is satisfied, where C is a capacitance of the electromechanical transducer, where L is an inductance of the inductive element, and where R is a resistance of the resistive element.

7. A drive mechanism as claimed in claim 1, the electromechanical transducer having a pair of ends in an expanding and contracting direction, the drive mechanism further comprising:

a drive member fixed to one of the ends of the electromechanical transducer; and a driven member which contacts frictionally with the drive member under a predetermined frictional force exerting therebetween, wherein the voltage having the saw-tooth waveform applied to the electromechanical transducer causes the electromechanical transducer to expand at the first velocity and to contract at the second velocity, different from the first velocity, so as to move the driven member along with the drive member relatively.

8. A driving method for running a drive mechanism which comprises:

an electromechanical transducer operating as a capacitor and having a pair of terminals;

an inductive element operating as an inductor and having a pair of terminals; and a resistive element operating as a resistor and having a pair of terminals, wherein the electromechanical transducer, the inductive element and the resistive element are connected by terminals thereof in series so as to constitute a series resonance circuit, the driving method comprising:

a first step of applying a voltage to the series resonance circuit so as to generate a voltage having a saw-tooth waveform applied to the electromechanical transducer; and a second step of expanding the electromechanical transducer at a first velocity and contracting the electromechanical transducer at a second velocity, different from the first velocity, by the voltage having the saw-tooth waveform applied to the electromechanical transducer generated at the first step.

9. A driving method as claimed in claim 8, wherein the voltage having a square waveform is applied to the series resonance circuit to perform the first step.

10. A driving method as claimed in claim 9, wherein one of the terminals of the electromechanical transducer is connected to ground, wherein the other of the terminals of the electromechanical transducer is connected to one of the terminals of the resistive element, wherein the other of the terminals of the resistive element is connected to one of the terminals of the inductive element, and wherein the voltage having the square waveform is applied to the other of the terminals of the inductive element so as to generate the voltage having the saw-tooth waveform applied to the other of the terminals of the electromechanical transducer to perform the first step.

11. A drive method as claimed in claim 9, wherein an inequality of $$0.4 \times fr < fd < 1.0 \times fr$$

is satisfied, where fd is a frequency of the voltage having the square waveform applied to the series resonance circuit, and where fr is a resonance frequency of the series resonance circuit.

12. A drive method as claimed in claim 9, wherein one of inequalities of $$0.05 < Du < 0.48 \text{ and } 0.52 < Du < 0.95$$

is satisfied, where Du is a duty ratio of the voltage having the square waveform applied to the series resonance circuit.

13. A drive method as claimed in claim 9, wherein an inequality of $$(1/15) \times (L/C)^{1/2} < R < (L/C)^{1/2}$$

is satisfied, where C is a capacitance of the electromechanical transducer, where L is an inductance of the inductive element, and where R is a resistance of the resistive element.

14. A drive method as claimed in claim 8, wherein the electromechanical transducer has a pair of ends in an expanding and contracting direction, and wherein the drive mechanism further comprises:

a drive member fixed to one of the ends of the electromechanical transducer; and a driven member which contacts frictionally with the drive member under a predetermined frictional force exerting therebetween, wherein the second step of expanding the electromechanical transducer at the first velocity and contracting the electromechanical transducer at the second velocity, different from the first velocity, is carried out so as to move the driven member along with the drive member.

15. A circuit for generating a voltage having a saw-tooth waveform, comprising:

an capacitance element operating as a capacitor and having a pair of terminals;

an inductive element operating as an inductor and having a pair of terminals; and a resistive element operating as a resistor and having a pair of terminals, wherein the capacitance element, the inductive element and the resistive element are connected by terminals thereof in series so as to constitute a series resonance circuit, and wherein a voltage having a square waveform applied to the series resonance circuit generates the voltage having the saw-tooth waveform applied to the capacitance element.

16. A circuit as claimed in claim 15, wherein one of the terminals of the capacitance element is connected to ground, wherein the other of the terminals of the capacitance element is connected to one of the terminals of the resistive element, wherein the other of the terminals of the resistive element is connected to one of the terminals of the inductive element, and wherein the voltage having the square waveform applied to the other of the terminals of the inductive element generates the voltage having the saw-tooth waveform applied to the other of the terminals of the capacitance element.

17. A circuit as claimed in claim 15, wherein an inequality of $$0.4 \times fr < fd < 1.0 \times fr$$

is satisfied, where fd is a frequency of the voltage having the square waveform applied to the series resonance circuit, and where fr is a resonance frequency of the series resonance circuit.

18. A circuit as claimed in claim 15, wherein one of inequalities of $$0.05 < Du < 0.48 \text{ and } 0.52 < Du < 0.95$$

is satisfied, where Du is a duty ratio of the voltage having the square waveform applied to the series resonance circuit.

19. A circuit as claimed in claim 15, wherein an inequality of $$(1/15) \times (L/C)^{1/2} < R < (L/C)^{1/2}$$

is satisfied, where C is a capacitance of the electromechanical transducer, where L is an inductance of the inductive element, and where R is a resistance of the resistive element.

* * * * *